United States Patent
Weibel et al.

(10) Patent No.: US 7,099,837 B1
(45) Date of Patent: Aug. 29, 2006

(54) SYSTEM OF GENERATING BILLING STATEMENTS FOR PUBLISHED ADVERTISING

(75) Inventors: Willard J. Weibel, Malvern, PA (US); Maria Elena Lopez, Hinsdale, IL (US); John Metsig, Barrington, IL (US)

(73) Assignee: Electronic Imaging Systems of America, Inc., Rolling Meadows, IL (US)

( * ) Notice: Subject to any disclaimer, the term of this patent is extended or adjusted under 35 U.S.C. 154(b) by 249 days.

(21) Appl. No.: 10/308,869

(22) Filed: Dec. 3, 2002

Related U.S. Application Data

(63) Continuation-in-part of application No. 09/418,744, filed on Oct. 15, 1999, now Pat. No. 6,505,173.

(51) Int. Cl.
*G06F 17/60* (2006.01)

(52) U.S. Cl. .......................................... 705/34; 705/30

(58) Field of Classification Search ................. 705/34, 705/40; 707/104; 455/406, 408, 407; 348/114, 348/118
See application file for complete search history.

(56) References Cited

U.S. PATENT DOCUMENTS

| | | |
|---|---|---|
| 6,026,368 A | 2/2000 | Brown et al. |
| 6,167,382 A * | 12/2000 | Sparks et al. ................. 705/26 |
| 6,173,271 B1 | 1/2001 | Goodman et al. |

FOREIGN PATENT DOCUMENTS

| | | |
|---|---|---|
| EP | 745 947 | 12/1996 |
| WO | 97/24680 | 7/1997 |

OTHER PUBLICATIONS

Newspaper Back Office Process Now Available; PR Newswire, Jun. 23, 1998, p. 1.*
Media passage Announces Digital Tear Sheets; ClickzNews, Jun. 24, 1998.*

* cited by examiner

*Primary Examiner*—Elaine Gort
(74) *Attorney, Agent, or Firm*—Pauley Petersen & Erickson

(57) ABSTRACT

A method of constructing a billing statement for publishing industry advertising or the like starts with digitizing the advertisement and the publication page the advertisement is on and assigning a unique identifier to at least the advertisement in an information header associated with the published image of the advertisement copy. The publication page may also be uniquely identified apart from the advertisement and contain reference to the advertisements thereon in its information header. An invoice is generated which searches at least the publication page database to find both the advertisement and page documents. The advertisement and page documents are associated with the billing statement and linked so that they may be accessed by the client such that manual preparation of invoices with advertisement copy and tear sheets no longer needs to be done.

8 Claims, 3 Drawing Sheets

SYSTEM OF GENERATING BILLING STATEMENTS FOR PUBLISHED ADVERTISING

This application is a continuation-in-part of U.S. application Ser. No. 09/418,744 filed 15 Oct. 1999 now U.S. Pat. No. 6,505,173.

BACKGROUND OF THE INVENTION

1. Field of the Invention

The present invention relates to means for creating a billing statement for a publishing business automatically and digitally with links to associated advertising copy and the published page containing such advertising copy.

2. Discussion of Related Art

Publishers of periodicals and dailies derive significant revenue from printing advertisements in their publications. Traditionally, the method of billing the advertiser, or customer, for the publication of the customer's advertisement is to send a billing sheet, or statement, listing the date of publication, an advertisement identifier, and the charge for the advertisement. Along with each billing line item is included a copy of the advertisement and a copy of the actual page or pages on which the advertisement was published. These hard copies of the advertisements and page are often called tearsheets. The tearsheets were, in the past, manually created by persons who gathered the physical tearsheets and attached them to the billing statements, resulting in a great expenditure of labor. Also, the billing statement created in this way can become physically bulky and unnecessarily hard to handle and expensive to deliver to the customer.

Therefore, there exists a need to automate this billing process and digitize it to make for easier storage, retrieval, and delivery.

SUMMARY OF THE INVENTION

The present invention provides for automated creation, and if desired, removable storage and delivery of billing statements for published advertisements. A method according to the present invention requires that the advertisement copy and the page on which it is published, if different, both be put in a digital document format such as tiff, jpeg, pdf, or the like; and assigned unique customer, or advertiser, identifiers, such as serial numbers, identifying numbers, unique names, or the like associated with the document. The advertisement copy and the page may contain cross referenced indicators. For example, the information header on the advertisement copy may contain information on its page location, while the page document information header may contain information on each customer having an advertisement thereon.

The advertisement copy and page files of images and their associated information headers are created; whether by original composition on a digital publishing system or through later digitization by scanning or the like; and stored in a first, or first and second publications searchable database. A billing statement application is then overlayed on, or interfaced with, the publication's databases in order to match the unique identifiers of the customers in the statement application to the unique customer identifiers in the publications databases. A search and retrieve command is sent to identify each advertisement and its associated page, within a particular date range and for a particular publication, if the publication database file structure makes this necessary. Copies of the digital documents representing the published advertisement copy and its associated page are linked, or referenced, to the billing document line items and stored as files within the billing statement application. Access from one of the digital documents to any other of its associated digital documents is enabled, e.g., in the manner of hypertext links, so that the publisher and the party being billed may select, display, and examine any document, in essence creating an electronic billing statement and tearsheet system without the need for manual labor.

In some aspects of the invention, the present invention may be used to interface with each of the publisher's electronic applications and databases to access, retrieve, and coordinate the processes necessary to accomplish electronic management of the production and billing process to the client.

The billing statement, and each associated advertisement copy and page image, may then be electronically accessed through links to one another for viewing and verification and may be transmitted electronically or stored on removable digital storage media such as diskettes or CD-Roms as desired for permanent record and shipping to the customer.

DESCRIPTION OF PREFERRED EMBODIMENTS

Figures 1, 2:
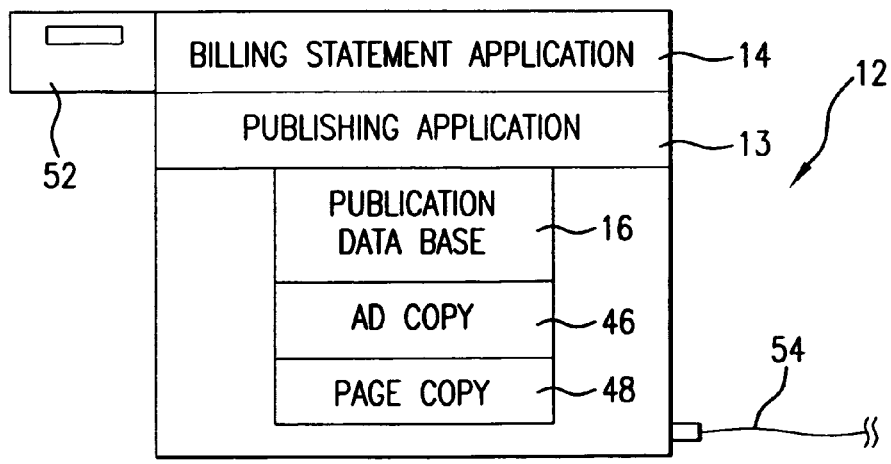
FIG. 1 is a billing statement document according to the present invention.
FIG. 2 illustrates a computer system for running a billing system according to the present invention.

Referencing FIGS. 1 and 2, a billing statement template 10 is contained in the server of a computer system 12 within a billing statement application 14. The computer system 12 further contains a publication database 16 generally associated with an electronic publishing/composition application 13 for the digital construction of stories, text, pictures, advertisements, and the like making up a publication such as a newspaper or magazine.

Figure 3:
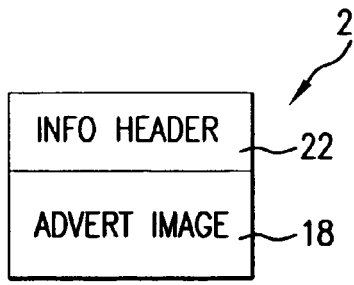
FIG. 3 illustrates an advertisement, or ad copy, retrievable by the present invention.

As seen in FIG. 3, an advertisement image copy 18 comprising text, pictorial images, and the like; is contained in a digital advertisement document 20 which also contains an information header 22 containing a customer identifier, such as a unique name, number, or the like associated with the customer paying for the publication of the image copy 18.

Figure 4:
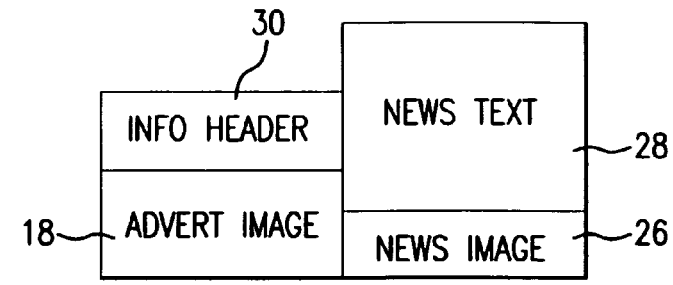
FIG. 4 illustrates the publication page on which the advertisement copy appears.

Referencing FIG. 4, the advertisement image copy 18, when it is to be published, is digitally placed within a page site 24 of a publication, along with other images 26, text files 28, and the like which make up that page 24 of the publication. The page site 24 contains an information header 30 containing such information as the publication name, date, page number, document file identifiers, advertiser customer identifier listings, etc.

Figure 5:
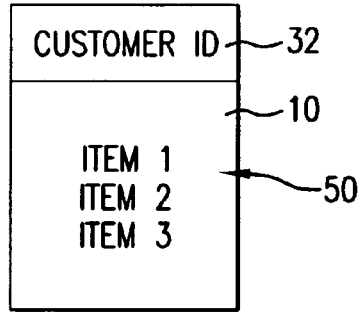
FIG. 5 schematically illustrates the digital billing statement, or invoice of the present invention document.

Referencing FIG. 5, the billing statement or invoice 10 has a customer identifier 32 which may be the same as a customer identifier 34 in the publication database 16 or the two customer identifiers may be cross referenced in the billing statement application 14.

Figure 6:
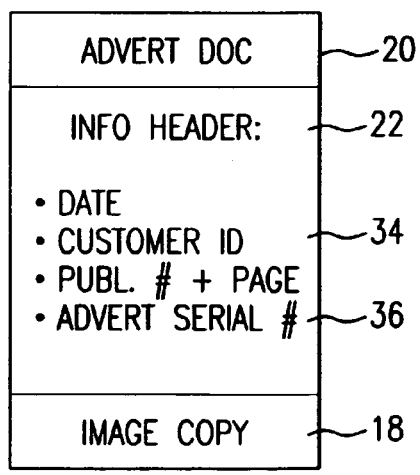
FIG. 6 schematically illustrates the digital advertisement copy document and information statement.

Referencing FIG. 6, the digital advertisement document 20 contains an information header 22 with all relevant information such as the customer identifier 34 and an advertisement copy serial number 36 identifying the particular image 18 of the advertisement which is preferably a separate file within the advertisement document 20.

Figure 7:
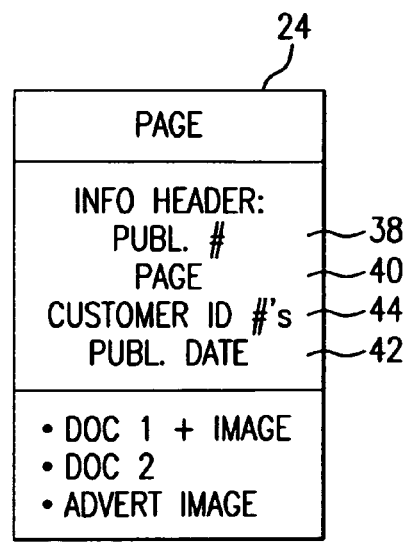
FIG. 7 schematically illustrates the digital publication page containing the advertisement copy and an information header thereof.

Referencing FIG. 7, the page site 24 is a document, or group of cross referenced documents, with an information header 30 detailing the publication number 38, the page number 40, publication date 42, and a list of the customers identifiers 44 for the advertisements placed on that page.

With the information headers as shown in FIGS. 6 and 7, a search and retrieve routine can be initiated from the billing statement application 14 for an individual customer by specifying a customer identifier and any qualifying ranges for the billing cycle such as a date range, publication volume numbers, etc. The customer identifiers may be cross matched as necessary between the billing statement application and the publishing application through the use of look up tables, a precompiled and referenced association table, or the like. The search will then take place in the publication database either in the advertisement copy information headers database 46 or the page site information headers database 48, or both, depending on how the publication application has allotted the customer identifiers and linked the associated advertisement images between the advertisement copy database and the page site database. Each instance of a customer identifier number "hit", or retrieval, will have an associated advertisement copy number and data identifier associated therewith. Each instance of a customer's advertisement being published then is listed as a line item, logo 50, on the billing statement 10. Copies of the digital advertisement document 20 and the page site 24 are retrieved, cross referenced to the line items 50 and the billing statement 10, and stored in, or with, the billing statement application 14 and in addition may be printed to removable storage 52 or downloaded as by telephone line 54 to the customer's information systems (not shown). It is desirable in each embodiment of the invention that the display of the associated billing, advertisement, and page documents be linked so that any one of the documents may be accessed and displayed from a display of its related documents.

Figure 8:
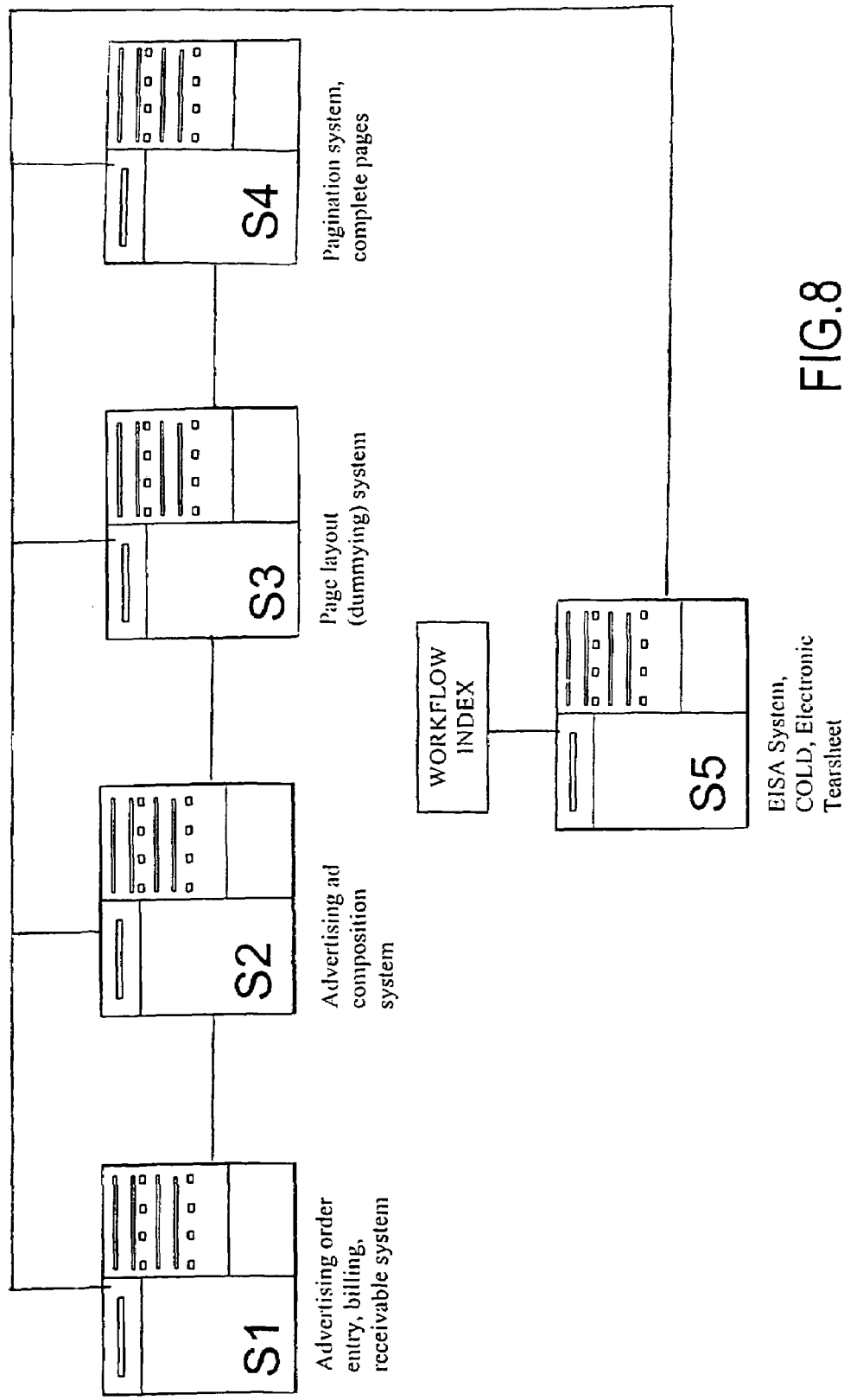
FIG. 8 schematically illustrates an aspect of the present invention whereby independent machines or multiple platforms typical of a publisher's infrastructure are coordinated to electronically provide traditional publishing industry billing services.

Referring to FIG. 8, there is shown a system of independent machines or multiple platforms typical of a publisher's infrastructure which is then coordinated by aspects of the present invention to electronically provide traditional billing services.

Server S1 is digital system used by a publisher for its advertising order entry functions including advertising order entry, billing, and an accounts receivable system. The advertising order entry Server S1 may be a stand alone machine with a unique software platform and contains digital applications and storage specific to the Server S1 functions. Such server systems are known in the art. On Server S1, an advertisement, also referred to as an "ad", can be scheduled, information about the ad entered, e.g., the run date, placement request, size, proof request, color, and other information specific to this ad. The ad specific information can be retrieved from the Server S1 database using the customer identifier, e.g., the account number, this ad is entered under.

Server S2 is digital system used by a publisher for its Advertising ad composition functions. The advertising ad composition Server S2 may, like Server S1, also be a stand alone machine with a unique software platform which contains digital applications and storage specific to the Server S2 functions. Such server systems are known in the art. Ad identifier information can be sent from Server S1 to create a file containing the information needed to compose the ad, e.g., the ad number, size, run date, proof request, color, etc. Text for the ad may be entered, and artwork can be scanned or retrieved from an archive or database of the Server S2. Server S2 allows the ad to be composed, output for proofing, and have corrections made and, when the ad is completed and ready for publication, the ad is marked as suitable to publish. Server S2 may archive ads for use in later publications.

Server S3 is digital system used by a publisher for its page layout functions. The advertising ad composition Server S3 may, like Server S1 and Server S2, also be a stand alone machine with a unique software platform which contains digital applications and storage specific to the Server S3 functions. Such server systems are known in the art. Ad information is sent from Server S1 or S2 or both, e.g., the ad number, size, position request, section request, publication, run date, etc. for use in the page layout function. The software of Server S3 may contain rules specific to the publisher regarding ad placement whereby the system automatically places ads on pages based on rules and algorithms, which the layout person has the ability to override. When all ads are placed satisfactorily, a file can be sent to S1 containing the ad number, publication, section, page number, date, and the work order status for the ad can be updated in Server S1. Information about each page can also sent to Server S4, described below, defining the geometry of each page in the publication. This information may include the ad number, page number, section, date, and the co-ordinates for the ad to fit on the page.

Server S4 is digital system used by a publisher for its pagination system functions. The advertising ad composition Server S4 may, like Servers S1–S3, also be a stand alone machine with a unique software platform which contains digital applications and storage specific to the Server S4 pagination system functions. Such server systems are known in the art. Server S4 receives information from S3 on the page geometry of the ads. A pagination terminal operator places news material, photos, charts, etc. on the page in open positions that the layout system (Server S3) has reserved for news, or editorial, material. When all ads, news, etc., are positioned on the page, a PDF file of the complete page can be created and stored on Server S4. The PDF file can be stored on Server S4 for short term archiving and the PDF file can be output to an imaging device that creates a page negative used to produce printing plates.

Server S5 is a digital system according to the present invention which can be used by a publisher for coordinating each of its billing system, advertising ad composition, page layout, and pagination functions of Servers S1–S4. Server S5 can also be a stand alone machine with a unique software platform which contains digital applications and storage specific to its functions.

Server S5 is where a Workflow Index is created that accesses, receives, and coordinates information from Servers S1–S4. The Workflow Index file will contain information to allow the present invention to access information about the publication and billing processes contained on other servers. In the present example, Server S1 provides ad scheduling and billing information, Server S2 provides the finished composed ad and information necessary to send an electronic proof of the ad, Server S3 provides page number and other information necessary to retrieve the fully composed page to create the electronic tearsheet, and Server S4 provides a digital representation of page or ad images, e.g., in PDF format, of the composed page. The Workflow Index through the establishment of links between each associated part of a billing statement and tearsheet system contained on the other servers, may thus enable a user to generate access and display the digitally formatted documents necessary to accomplish an effective electronic billing statement for published material.

The workflow index further provides linkage between each billing statement component, and enables a system user to access any billing statement component from another billing statement component and view said components through an I/O interface, such as a printer or viewing screen of the user (not shown), according to the present invention. For example, Server S5 may further allow functions including the viewing of an entire publication page by clicking on a displayed ad number on a billing statement screen or the viewing of an individual ad by clicking on a displayed ad number on a billing statement screen. A client who is remote from the publisher, such as an advertising agency or an advertiser, may be granted access to view statements, individual ads, and page displays by a secure internet connection. Access to digital publication pages and ads can be provided even before a billing statement is produced, by accessing the digital publication pages or ads through the Workflow Index. Electronic mail notification may be sent to advertisers or agencies that a digital publication page is available for viewing or the present invention can provide for the electronic mailing of digital publication page or ad images, e.g., in compressed PDF format, along with any other necessary or desired identifying information. Electronic watermarks may be provided on each page for authenticity verification.

Server S5 further allows digital archiving of the publisher's billing components including the billing statement, the page copy and the ad copy. Thus all billing components may be archived and recorded, such as by a computer output to a laser disk (COLD) system.

Server S5 may further allow an electronic proofing process between the publisher and the remote client by providing software and hardware functionality to electronically mail notice to the client that a proof image of an ad or a page is ready to access or provide for electronic mailing of a digital representation of page or ad images of the proof. Further the present invention may automatically generate electronic mail to a remote client at a set time of day based on indicators in the Workflow Index. Such remote communications are desirably accomplished by secure internet access.

While referred to as files, documents, and sites, it will be appreciated that there are myriad ways to cross reference, store, and process the relevant image blocks going into the advertisement copy and page site make up. The examples of the Preferred Embodiment are intended to be illustrative only and the invention herein is limited only by the appended claims.

We claim:

1. A method of constructing a billing statement for advertising customers placing advertisements in printed publications, comprising:

a. creating a printed advertisement image for an advertising customer on a printed publication page in a publication with additional pages of images and text advertisement;
   b. establishing a unique customer identifier for the advertising customer;
   c. creating a first digital document representing at least the printed advertisement image with a unique advertisement identifier and associating the unique customer identifier with the advertisement identifier;
   d. creating a second digital document representing an invoice for printed advertisements and associating the unique customer identifier with the invoice and providing the advertising customer with the invoice; and
   e. enabling the advertising customer to access to the first digital document through the second digital document to view the advertisement image and verify publication of the advertisement.

2. The method of claim 1 further including the step of forwarding the first digital document representing at least the printed advertisement image and the second digital document representing an invoice for printed advertisements to the advertising customer.

3. The method of claim 1 further including the step of creating a third digital document representing the printed publication page image containing the advertisement image and associating the third digital document with the unique advertisement identifier and enabling the advertising customer to access to the third digital document through the second digital document.

4. The method of claim 1 further including the step of creating a third digital document representing the printed publication page image containing the advertisement image and associating the third digital document with the unique advertisement identifier and enabling the advertising customer to access to the third digital document through the first digital document.

5. The method of claim 1 further including the step of creating a third digital document representing the printed publication page image containing the advertisement image and associating the third digital document with the unique advertisement identifier and enabling the advertising customer to access to any of the first, second, and third digital documents through any of the first, second, and third digital documents.

6. A method of constructing a billing statement for advertising customers placing advertisements in printed publications with additional pages of images and text advertisement, comprising:

a. creating a printed advertisement image for an advertising customer on a printed publication page in a publication with additional pages of images and text advertisement;
   b. establishing a unique customer identifier for the advertising customer;
   c. creating a first digital document representing at least one of the printed advertisement image or the printed publication page with a unique advertisement identifier, and associating the customer identifier with the unique advertisement identifier;
   d. creating a second digital document representing an invoice having a line item billing for advertisements of the advertising customer and associating the unique customer identifier; with the invoice and providing the advertising customer with the invoice; and
   e. enabling the advertising customer to access to the first digital document through a line item of the invoice to view the first digital document in human readable form and verify publication of the advertisement.

7. A method of constructing a billing statement for advertising customers placing advertisements in printed publications with additional pages of images and text advertisement, comprising:
   a. establishing a unique customer identifier for an advertising customer;
   b. creating a first digital document representing a printed and published advertisement image for the advertising customer with a unique advertisement identifier and associating the unique customer identifier with the unique advertisement identifier;
   C. creating a second digital document representing a printed and published publication page image containing the printed and published advertisement image as the published publication page image appears in a publication with additional pages of images and text advertisement and associating the second digital document with the unique advertisement identifier;
   d. creating a third digital document representing an invoice for printed and published advertisements including a form for specifying an identifier range for invoiced printed and published advertisements with the invoice and providing the advertising customer with the invoice and the form;
   e. finding the first digital document by searching the unique customer identifier in a first database and copying the first digital document to an invoice database;
   f. finding the second digital document and copying the second digital document to the invoice database;
   g. storing the first and second digital documents in a common file associated with the third digital document; and
   h. enabling the advertising customer to access at least one of the first and second digital documents through the third digital document to view the first digital document in human readable form and verify publication of the advertisement.

8. A method of constructing a billing statement for advertising customers placing advertisements in printed publications with additional pages of images and text advertisement, comprising:
   a. establishing a unique customer identifier for an advertising customer to be billed;
   b. creating a digital billing invoice document and associating the digital billing invoice document with the unique customer identifier and storing the digital billing invoice document in an invoice file and providing the advertising customer with the invoice;
   c. creating a printed advertisement image for the advertising customer on a printed publication page;
   d. creating a digital advertisement document representing the printed advertisement image with a unique advertisement identifier and associating the unique customer identifier with the unique advertisement identifier and storing the digital advertisement document in an advertisement database;
   e. creating a digital publication page representing the printed publication page in a publication with additional pages of images and text advertisement, with the digital advertisement document thereon, and having a unique page identifier; and associating the unique page identifier with the unique advertisement identifier and storing the digital publication page document in a publication page database;
   f. enabling the advertising customer to search for the digital advertisement document in the advertisement database according to the customer identifier, identifying the digital advertisement document according to the customer identifier, and displaying the identified digital advertisement document in human readable form;
   g. enabling the advertising customer to search for the digital publication page associated with the digital advertisement document in the publication page database and displaying the identified digital advertisement document in human readable form; and
   h. enabling the advertising customer to cross reference the billing invoice, advertisement, and publication page digital documents from the invoice file to view the first digital document in human readable form and verify publication of the advertisement.

* * * * *

(12) EX PARTE REEXAMINATION CERTIFICATE (7901st)
United States Patent
Weibel et al.

(10) Number: US 7,099,837 C1
(45) Certificate Issued: Nov. 30, 2010

(54) SYSTEM OF GENERATING BILLING STATEMENTS FOR PUBLISHED ADVERTISING

(75) Inventors: Willard J. Weibel, Malvern, PA (US); Maria Elena Lopez, Hinsdale, IL (US); John Metsig, Barrington, IL (US)

(73) Assignee: Source 3 Systems, LLC, Phoenix, AZ (US)

Reexamination Request:
No. 90/008,647, May 18, 2007

Reexamination Certificate for:
Patent No.: 7,099,837
Issued: Aug. 29, 2006
Appl. No.: 10/308,869
Filed: Dec. 3, 2002

Related U.S. Application Data

(63) Continuation-in-part of application No. 09/418,744, filed on Oct. 15, 1999, now Pat. No. 6,505,173.

(51) Int. Cl.
*H04M 15/00* (2006.01)

(52) U.S. Cl. .......................................... 705/34; 705/30
(58) Field of Classification Search .................... None
See application file for complete search history.

(56) References Cited

U.S. PATENT DOCUMENTS 5,963,925 A 10/1999 Kolling et al.
6,128,603 A 10/2000 Dent et al.
6,304,857 B1 10/2001 Heindel et al.
6,938,051 B1 8/2005 Burger et al.

FOREIGN PATENT DOCUMENTS

WO WO 01/067361 9/2001

OTHER PUBLICATIONS

Newton's Telecom Dictionary, 9$^{th}$ Edition, p. 573, Flatiron Publishing, Inc., New York, NY (1995).
*Media Passage Announces Digital Tear Sheets Digital Solution to Cumbersome Newspaper Back Office Process Now Available,* Jun. 23, 1998, available in http://www.prnewswire.com.
Why BT Claims It Owns the Right to Click Here', BBC News, Feb. 11, 2002, *available in* http://news.bbc.co.uk.

*Primary Examiner*—Peter C. English

(57) ABSTRACT

A method of constructing a billing statement for publishing industry advertising or the like starts with digitizing the advertisement and the publication page the advertisement is on and assigning a unique identifier to at least the advertisement in an information header associated with the published image of the advertisement copy. The publication page may also be uniquely identified apart from the advertisement and contain reference to the advertisements thereon in its information header. An invoice is generated which searches at least the publication page database to find both the advertisement and page documents. The advertisement and page documents are associated with the billing statement and linked so that they may be accessed by the client such that manual preparation of invoices with advertisement copy and tear sheets no longer needs to be done.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 7 is confirmed.

Claims 1-6 are cancelled.

Claim 8 is determined to be patentable as amended.

New claims 9-12 are added and determined to be patentable.

8. A method of constructing a billing statement for advertising customers placing advertisements in printed publications with additional pages of images and text advertisement, comprising:
   a. establishing a unique customer identifier for an advertising customer to be billed;
   b. creating a digital billing invoice document and associating the digital billing invoice document with the unique customer identifier and storing the digital billing invoice document in an invoice file and providing the advertising customer with the invoice;
   c. creating a printed advertisement image for the advertising customer on a printed publication page;
   d. creating a digital advertisement document representing the printed advertisement image with a unique advertisement identifier and associating the unique customer identifier with the unique advertisement identifier and storing the digital advertisement document in an advertisement database;
   e. creating a digital publication page representing the printed publication page in a publication with additional pages of images and text advertisement, with the digital advertisement document thereon, and having a unique page identifier; and associating the unique page identifier with the unique advertisement identifier and storing the digital publication page document in a publication page database;
   f. enabling the advertising customer to search for the digital advertisement document in the advertisement database according to the customer identifier, identifying the digital advertisement document according to the customer identifier, and displaying the identified digital advertisement document in human readable form;
   g. enabling the advertising customer to search for the digital publication page associated with the digital advertisement document in the publication page database and displaying the identified digital advertisement document in human readable form; and
   h. enabling the advertising customer to cross reference the billing invoice, advertisement, and publication page digital documents from the invoice file to view the [first] digital *advertisement* document in human readable form and verify publication of the advertisement.

9. *The method of claim 7 further including the step of forwarding the digital document representing the printed advertisement image and the digital document representing an invoice for printed advertisements to the advertising customer.*

10. *The method of claim 8 further comprising notifying the advertising customer by electronic mail notification that the digital publication page is available for viewing.*

11. *The method of claim 8 further comprising notifying the advertising customer by electronic mail notification that the digital advertisement document is available for viewing.*

12. *The method of claim 8 further including the step of forwarding the digital document representing the printed advertisement image and the digital billing invoice document to the advertising customer.*

\* \* \* \* \*